United States Patent [19]

Bezos et al.

[11] Patent Number: 6,029,141
[45] Date of Patent: Feb. 22, 2000

[54] INTERNET-BASED CUSTOMER REFERRAL SYSTEM

[75] Inventors: Jeffrey P. Bezos; Sheldon J. Kaphan; Ellen L. Ratajak; Thomas K. Schonhoff, all of Seattle, Wash.

[73] Assignee: Amazon.com, Inc., Seattle, Wash.

[21] Appl. No.: 08/883,770

[22] Filed: Jun. 27, 1997

[51] Int. Cl.[7] ................................................... G06F 17/60
[52] U.S. Cl. ................................. 705/27; 705/26; 705/10
[58] Field of Search ................................. 705/27, 10, 14, 705/26; 707/513; 395/200.3, 200.33, 200.53, 200.54, 200.57

[56] References Cited

U.S. PATENT DOCUMENTS

| | | | |
|---|---|---|---|
| 5,319,542 | 6/1994 | King, Jr. et al. | .......................... 705/27 |
| 5,537,314 | 7/1996 | Kanter . | |
| 5,590,197 | 12/1996 | Chen et al. . | |

(List continued on next page.)

OTHER PUBLICATIONS

Dialog file 16 (database PROMT(R)), No. 6016914, "Book-Site launches version 3.0 of the popular electronic commerce web site.", Business Wire, 2 pages, Feb. 23, 1996.

Dialog file 16 (database PROMT(R)), No. 6296727, "Amazon.com introduces "Amazon.com Associates"—a new model for internet–based commerce." Business Wire, 3 pages, Jul. 18, 1996.

Can Mixing 'Cookies' with Online Marketing be a Receipe for Heartburn? (Infoworld, vol. 18, No. 30), Jul. 22, 1996.

Real Time Travel Info Available Online (Dialog database file 9, document 01107096), Jan. 17, 1995.

Online Growth Virtually Untapped; PC Vendors Taking More Advantage of Booming Sales (Computer Retail Week vol. 4, No. 64, p. 160), Jun. 6, 1994.

Selected document from Books.com Web site describing Book Stacks Unlimited links partner program, downloaded and printed Jun. 20, 1997 and Jun. 23, 1997.

Selected documents from Incognito Cafe Web site describing several on–line bookstore links, undated (5 printed pages).

Resnick, P., Iacovou, N., Suchak, M., Bergstrom, P., and Riedl, J., GroupLens: An Open Architecture for Collaborative Filtering of Netnews. *Proceedings of ACM 1994 Conference on Computer Supported Cooperative Work*, Chapel Hill, NC, pp. 175–186.

Balabanovic, M., and Shoham, Y., Fab: Content–Based, Collaborative Recommendation. *Communications of the ACM*, vol. 40., No. 3, (Mar. 1997) pp. 66–73.

*Primary Examiner*—Emanuel Todd Voeltz
*Assistant Examiner*—Alexander Kalinowski
*Attorney, Agent, or Firm*—Knobbe, Martens Olson & Bear, LLP

[57] ABSTRACT

Disclosed is an Internet-based referral system that enables individuals and other business entities ("associates") to market products, in return for a commission, that are sold from a merchant's Web site. The system includes automated registration software that runs on the merchant's Web site to allow entities to register as associates. Following registration, the associate sets up a Web site (or other information dissemination system) to distribute hypertextual catalog documents that includes marketing information (product reviews, recommendations, etc.) about selected products of the merchant. In association with each such product, the catalog document includes a hypertextual "referral link" that allows a user ("customer") to link to the merchant's site and purchase the product. When a customer selects a referral link, the customer's computer transmits unique IDs of the selected product and of the associate to the merchant's site, allowing the merchant to identify the product and the referring associate. If the customer subsequently purchases the product from the merchant's site, a commission is automatically credited to an account of the referring associate. The merchant site also implements an electronic shopping cart that allows the customer to select products from multiple different Web sites, and then perform a single "check out" from the merchant's site.

42 Claims, 14 Drawing Sheets

U.S. PATENT DOCUMENTS

| | | | |
|---|---|---|---|
| 5,712,979 | 1/1998 | Graber et al. | 395/200.54 |
| 5,715,314 | 2/1998 | Payne et al. | 380/24 |
| 5,717,860 | 2/1998 | Graber et al. | 395/200.57 |
| 5,724,424 | 3/1998 | Gifford | 380/24 |
| 5,745,681 | 4/1998 | Levine et al. | 395/200.3 |
| 5,812,769 | 9/1998 | Graber et al. | 395/200.58 |
| 5,819,285 | 10/1998 | Damico et al. | 707/104 |

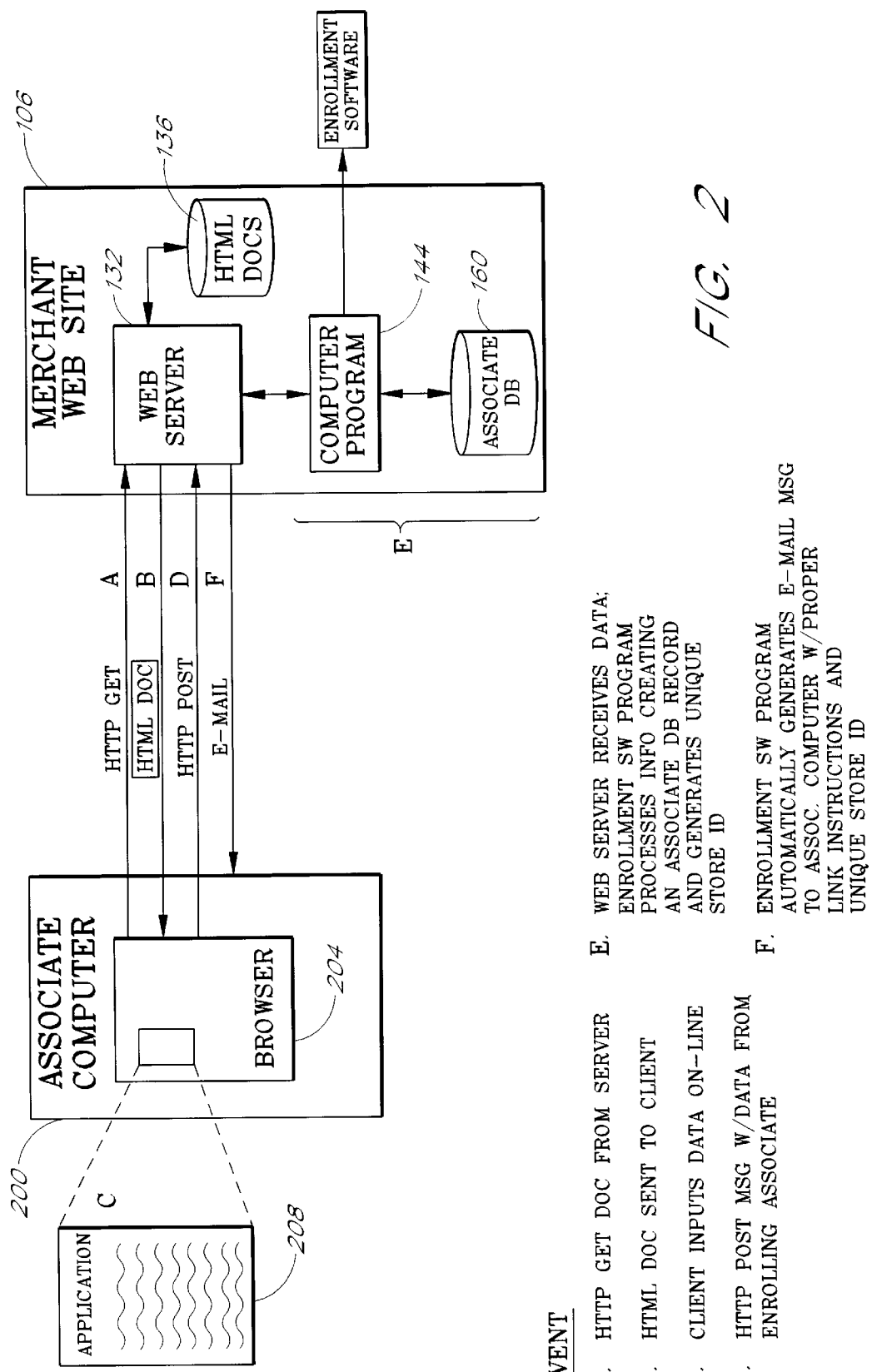

ARTICLES & INTERVIEWS
Amazon.com Journal
Eclectica
In Their Own Words

SIGN-UP
Eyes
Expert Editors

BIG FUN
Win Prizes
Wanna Play?
Customer Reviews

PARTNERS
Associates
Publishers
Authors

AMAZON.COM
About Our Store
Press Clips
Join Our Staff
Customer Comments
Send Us E-mail

HELP
Help Desk
Your Account
New User Guide
Home

Address Line 1:

Address Line 2:

City:

State:

ZIP Code:

Phone number:

Payee's e-mail address:

Describe Your Existing Web Site

Enter the name and URL of the Web site through which you wish to link to our books.

Name of the sponsoring Web site:

Home page URL of sponsoring Web site:
http://

Describe Your Intended Book Listings:

Briefly describe the type of books you intend to list on your site. Add any other brief comments or explanation (try to keep this under 10 lines or so):

FIG. 3b

Description and comments:

At some point, we may decide to display your name somewhere on our pages during a customer order, e.g. "Good Zookeeping Magazine in association with Amazon.com". Please enter the name we should use to refer to you if we do so. In the above example, the name you entered would have been "Good Zookeeping Magazine". In many cases, we know that this will be the same as the name of your sponsoring Web site, but please enter the correct name again here:

Enter the name we should use on these pages:

Submit your application

Before finalizing and submitting your application, please review the Operating Agreement, which describes the terms and conditions of your participation in the Associates Program. Once you have filled out this form and reviewed the agreement, press the "Yes" button to submit your application or the "No" button to exit.

By pressing the "yes" button, you indicate that you want to apply to participate in the Amazon.com Associates Program, that you have reviewed the Operating Agreement and understand its contents, and that, if Amazon.com, Inc. accepts this application, you agree to be bound by the terms and conditions of the operating agreement.

| Yes, I want to participate |

| No, I do not want to participate |

FIG. 3c

```
<HR>
<H2>New Titles</H2>
<IMG  Align=Left border=1   SRC="terraincov.gif">
<H3><A HREF="http://www.amazon.com/exec/obidos/ISBN=0809232022/skinetA/">Terrain Skiing:</A></H3>
<H4>How to master tough skiing, like the experts! </H4>
<H4>By Seth Masia</h4>
```
You've been through ski school and are a good skier -- on groomed terrain. Now what? How do you take your skills into difficult terrain and snow conditions? Seth Masia, long-time Ski Magazine writer and a veteran of the Squaw Valley Ski School, provides insight into how experts make tough conditions look easy-- and how you can too. The book emphasizes terrain absorption and cross-over skills that are especially useful for skiers adopting the new supersidecut skis.

Selected as the official manual of the North American Ski Training Center

"Covers snow conditions like crust, ice, and powder, and terrain situations like bumps, trees and chutes in ways that are succinct and to the point. Skiers want outcome-specific instructions and this book gives it." -- Dave Merriam, Ski Magazine instruction editor and head coach of the PSIA Demonstration Teams.

"full of mountain smarts and savvy." --Snow Country

```
$12.95.   Contemporary Books ISBN 0-8092-3202-2<P>
<A HREF="http://www.amazon.com/exec/obidos/ISBN=0809232022/skinetA/">Click here to order Terrain Skiing!</A>
<HR>
```

FIG. 7 starchefs cookbook store

Welcome to the new StarChefs Cookbook Store.

Thanks for stopping in! We're filling our shelves to offer you books from the starchefs and cookbook authors we feature as well as others. Best of all is that because of our association with Amazon Books we can get any book you want, at any time of day or night...24 hours a day. They can even be giftwrapped and delivered with a note for an epicurean friend! Don't forget to bookmark this page as we will be adding new books all the time!

| | | |
|---|---|---|
| Darina Allen | Daniel Boulud | David Burke |
| The Complete Book of Irish Country Cooking: | Cooking With Daniel Boulud | Cooking with David Burke |
| Traditional and Wholesome Recipes from Ireland | Hardcover | Hardcover |
| Hardcover | Published by Random House | Published by Knopf |
| Published by Penguin USA | | |
| --Order This CookBook | --Order This CookBook | --Order This CookBook |
| --More CookBook Info | --More CookBook Info | --More CookBook Info |

1000

*more*

FIG. 10a

| Links | | Address | http://www.amazon.com/exec/obidos/ISBN=0679404090/StarChefsCookbookA/6708-3627535-656201 | ▶ |

AMAZON.COM

Text Only

SEARCH BY
Author, Title, Subject
Keyword
ISBN
Advanced Query

BUY BOOKS
Shopping Cart
Checkout

SUPER ROOM
Computer & Internet

WELCOME TO EARTH'S BIGGEST BOOKSTORE

Amazon.com:

Click here to search our 2.5 million title catalog

Cooking With Daniel Boulud
by Daniel Boulud, Todd France (Photographer)

1 Edition
Hardcover, 385 pages
Published by Random House
Publication date: November 1, 1993
Dimensions (in inches): 10.31 x 8.35 x 1.03
ISBN: 0679404090
List: $50.00 ~ Our Price: $35.00 ~ You Save: $15.00 (30%)
Availability: On Order, usually ships within 1-2 weeks.

[Add it to your Shopping Cart] ← 1002
(You can always remove it later...)

FIG. 10b

INTERNET-BASED CUSTOMER REFERRAL SYSTEM

FIELD OF THE INVENTION

This invention relates to electronic commerce. Specifically, this invention relates to information processing methods for marketing and selling goods via the Internet or other interactive network.

APPENDICES

Included as Appendices A and B are documents that illustrate a preferred embodiment of the invention. These materials form part of the disclosure of the specification.

BACKGROUND OF THE INVENTION

With the increasing popularity of the Internet and the World Wide Web, it has become common for merchants to set up Web sites for marketing and selling goods. One example of such a Web site is the online bookstore site of AMAZON.COM, the assignee of the present invention. Via this site, consumers can access and place orders from an online book catalog that includes millions of titles.

One problem commonly encountered by online merchants is an inability to effectively market goods via their Web sites. Because the customer cannot physically inspect the products via the Web site, and typically cannot talk to a salesperson, it is desirable that the site provide access to product reviews, product ratings, and other information that can be relied on by the customer to make an informed decision. In many cases, however, the merchant lacks the resources needed to generate or otherwise obtain such information, especially if the merchant sells a large and diverse selection of goods. For example, it would not be practical for AMAZON.COM to prepare reviews of all, or even a significant portion of, the millions of titles available on the AMAZON.COM site.

Another problem commonly faced by online merchants is an inability to efficiently attract potential consumers to their Web sites. One way of attracting consumers has been to market the site through television, newspaper and Internet advertisements. However, advertising a site using conventional methods can be expensive, and can consume significant human resources. In addition, it is often difficult or impossible to evaluate the effectiveness of a given advertisement.

The present invention addresses these and other problems.

SUMMARY OF THE INVENTION

The present invention provides a software system and method for enabling an Internet sales entity, referred to herein as the "merchant," to efficiently market and sell goods in cooperation with Web sites or other network sites of respective business partners, referred to herein as "associates." The system and method are implemented in part by software that runs on the merchant's Web site. Through this site, an entity can enroll (via an automated registration process) as an associate, and can then disseminate catalogs (Web documents, PUSH documents, e-mail newsletters, etc.) that include the associate's reviews and/or recommendations on specific products sold by the merchant.

In accordance with one aspect of the invention, the associate catalog documents include product-specific hyperlinks, referred to herein as "referral links," that allow potential customers to link to the merchant's Web site to initiate purchases of such products from the merchant. Each referral link is provided within the catalog document in association with referral information that is transmitted to the merchant's site when a user (customer) clicks on the referral link. This referral information preferably includes the unique ID of the associate (assigned upon enrollment) and the unique ID of the selected product. Referral processing software running on the merchant site uses this information to identify the associate that referred the customer to the merchant site, and to identify the product selected from the associate's catalog. If the customer subsequently purchases the selected product from the merchant site (e.g., by filling out an order form page and submitting the order), the referral processing software automatically credits the referring associate for the referral by, for example, applying a commission to an account of the associate. In one implementation, the referral commission is automatically generated based on a fixed percentage of the merchant's selling price, and is paid to the associate electronically on a periodic basis (such as every calendar quarter).

In accordance with another aspect of the invention, the merchant site implements an automated associate enrollment process for allowing individuals and business entities to register as associates. The enrollment process is implemented in part by Web pages that are transmitted to the computer of the associate applicant, and by enrollment software that runs on the merchant site. During the enrollment process, the applicant is presented with an online business agreement (in the form of a Web page) that sets forth the terms and conditions of doing business with the merchant. In addition, the applicant is presented with an online form that requests various information, such as the name, payment address and e-mail address of the applicant and a description of the proposed associate Web site. In one implementation, the enrollment software includes text scanning code that automatically scans the completed form for pre-specified words and phrases (vulgarities, etc.) that may give rise to a rejection of the application, and flags the application for further (human) review when such a word or phrase is found.

As part of the online registration, the application is processed (either automatically or by a staff member of the merchant), and the enrollment software generates and assigns a unique associate ID to the applicant, and stores this ID (together with other associate information) in an associate database of the merchant site. In addition, the enrollment software generates and sends an e-mail message to the associate with instructions for placing referral links within catalog documents.

In a preferred embodiment, the merchant site includes code that maintains a unified shopping cart data structure ("shopping cart") for each ongoing customer shopping session. For each ongoing shopping session, the shopping cart maintains a record of at least: (i) the products that are currently selected by the customer for prospective purchase, and (ii) the referral source (if any) of each such product. In one implementation, each shopping cart persists on the merchant site for an extended period of time (such as one week) following the most recent access by the customer, thereby allowing the customer to conduct extended shopping sessions. To purchase the products represented within the shopping cart, the customer proceeds to a "check out" area of the merchant site and submits an order. Software running on the merchant site then uses the information collected within the shopping cart to identify, and appropriately credit the account of, each associate that provided a corresponding referral.

An important benefit of the shopping cart feature is that it allows the customer to select products from multiple different sites, and then perform a single check-out to purchase all of the selected products. Another benefit is that it provides an efficient mechanism for crediting the accounts of the associates at the time of purchase. Although the use of a shopping cart provides certain advantages, the referral tracking and crediting features of the invention can be implemented without the use of a shopping cart.

In one implementation, the various components are provided on the Web site of AMAZON.COM as part of the AMAZON.COM Associates Program. Through this program, an individual or business entity can register as an AMAZON.COM associate, and can then set up a Web site to market customized subsets of the books (typically in a particular area of expertise) available from the AMAZON.COM site. For example, a computer company can set up a site (or add an area to an existing site) to recommend and sell selected books on computer programming languages, and a Cajun chef can set up a site to recommend and sell selected books on New Orleans style cooking. The associate is in turn paid a commission or other consideration based on the referrals that result in actual purchases. Because AMAZON.COM handles the various tasks associated with processing orders from customers (including shipping, collections, and customer service), the associate need only be concerned with the administration of the associate Web site.

An important benefit of the invention is that it allows the task of marketing the merchant's products to be efficiently distributed among entities that have established reputations and exposure within their respective fields. Another benefit is that it provides an efficient mechanism for exposing the merchant's Web site to the public, by encouraging others (associates) to set up outgoing links to the merchant's site.

Because the associate enrollment and referral tracking/credit functions are automated in whole or in part, these benefits can be realized with minimal supervision by the merchant. In addition, because the compensation provided to the associates is performance-based (e.g., based on the number of referrals that result in actual sales), the merchant need not be concerned with the existence of large numbers of associates that provide relatively small numbers of referrals.

BRIEF DESCRIPTION OF THE DRAWINGS

These and other features and advantages of the invention will now be described with reference to the drawings of certain preferred embodiments, which are intended to illustrate and not to limit the invention, and in which:

FIG. 2 is an architectural drawing and flow diagram illustrating the enrollment function of the system.

FIGS. 3a–3c are respective screen displays further illustrating the enrollment function.

FIG. 7 is an HTML listing illustrating a preferred method for embedding a referral link within a catalog document of an associate's Web site.

FIGS. 10a–10c are screen displays illustrating HTML documents of the merchant Web site.

Figure 1:
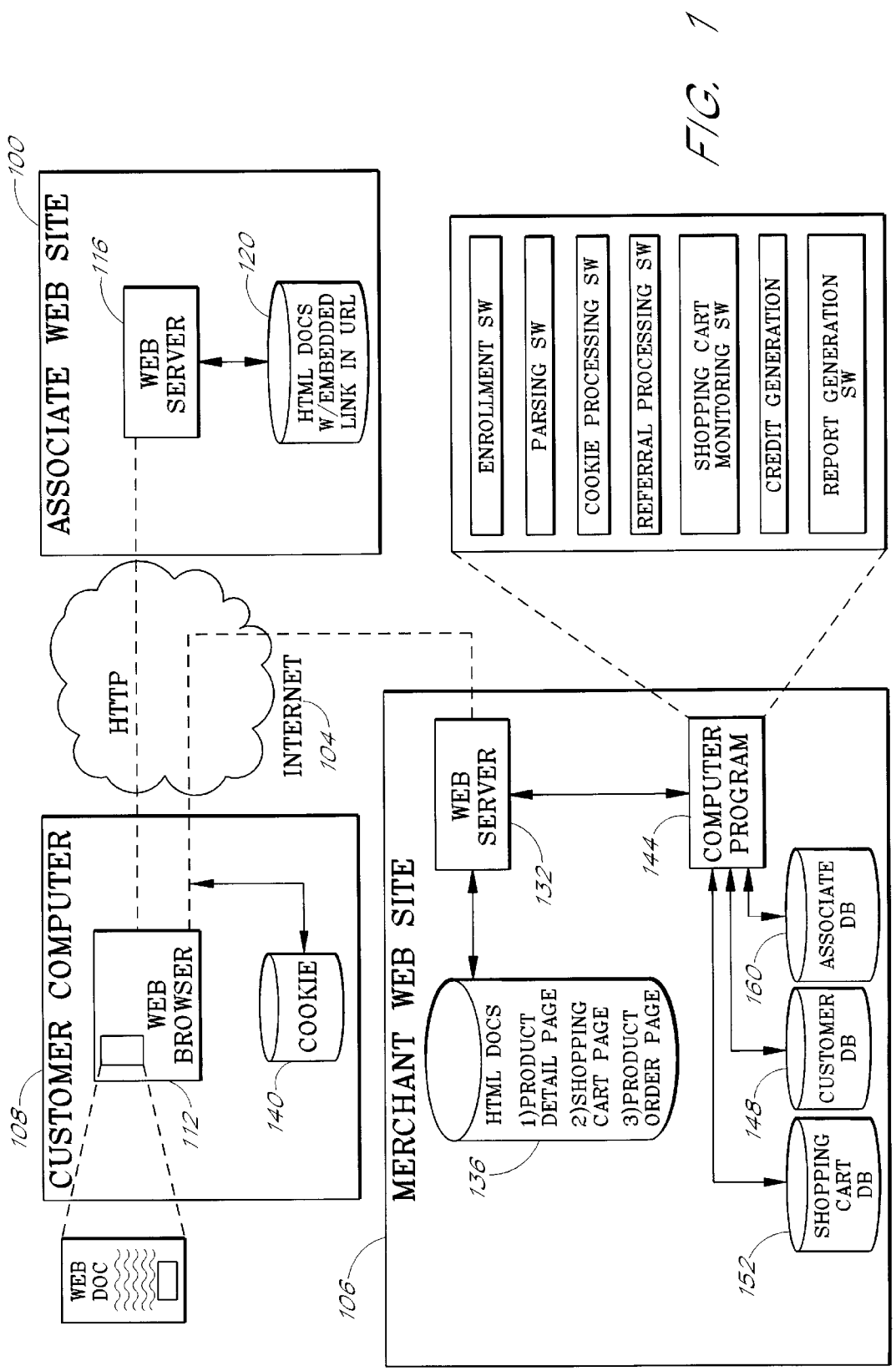
FIG. 1 is a high-level architectural drawing illustrating the primary components of a system that operates in accordance with the present invention.

In the drawings, the first digit of each reference number indicates the Figure number in which the referenced item first appears.

DETAILED DESCRIPTION OF THE PREFERRED EMBODIMENT

To facilitate a complete understanding of the invention, the description of the preferred embodiment is arranged within the following sections:

1. GLOSSARY OF TERMS AND ACRONYMS
2. OVERVIEW OF SYSTEM COMPONENTS AND OPERATION
3. ASSOCIATE ENROLLMENT FUNCTION
4. REFERRAL TRANSACTION FUNCTION
5. UNIFIED SHOPPING CART FUNCTION
6. REPORT GENERATION FUNCTION
7. CONCLUSION

1. Glossary of Terms and Acronyms

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web"

are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "amazon.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks"). For more information on HTML, see Ian S. Graham, *The HTML Source Book*, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

ISBN (International Standard Book Number). A numerical identifier associated with books, pamphlets, educational kits, microforms, CD-ROM and braille publications in circulation throughout the world. The ISBN is a ten-digit number assigned to each published title that provides an unduplicated, internationally recognized "identity."

URL (Uniform Resource Locator). A unique address which fully specifies the location of a file or other resource on the Internet. The general format of a URL is protocol:// machine address:port/path/filename. The port specification is optional, and if none is entered by the user, the browser defaults to the standard port for whatever service is specified as the protocol. For example, if HTTP is specified as the protocol, the browser will use the HTTP default port of 80.

Cookies. A technology that enables a Web server to retrieve information from a user's computer that reveals prior browsing activities of the user. The informational item stored on the user's computer (typically on the hard drive) is commonly referred to as a "cookie." Many standard Web browsers support the use of cookies.

PUSH Technology. An information dissemination technology used to send data to users over a network. In contrast to the World Wide Web (a "pull" technology), in which the client browser must request a Web page before it is sent, PUSH protocols send the informational content to the user computer automatically, typically based on information pre-specified by the user.

2. Overview of System Components and Operation

FIG. 1 illustrates the general architecture of a referral system that operates in accordance with the present invention. The system includes a customer computer 108, an associate Web site 100, and a merchant Web site 106, all of which are linked together by the Internet 104. The customer computer 108 may be any type of computing device that allows a user ("customer") to interactively browse Web sites via a Web browser 112. For example, the customer computer 108 may be a personal computer (PC) that runs the Windows NT operating system.

The merchant Web site 106 is a site that provides various functionality for allowing customers to purchase products, including products selected from the Web sites of associates. Typically, this site will be operated by a business entity (referred to herein as the "merchant") that handles the various order processing, shipping, collections, and customer service tasks associated with the sale of goods. In an implementation described herein, the merchant Web site 106 is the site of AMAZON.COM.

As described below, the site 106 includes enrollment software that implements an online registration process for allowing other entities (individuals, companies, etc.) to register as associates. An entity enrolling as an associate provides the merchant Web site 106 with a completed, online registration application that is processed by an enrollment software program ("SW") at the site 106. The enrollment software creates an entry in the associate database 160 according to the information provided by the enrolling associate.

The associate's Web site 100 is the site of an entity that has registered with the merchant, via the online registration process, to market a subset of the merchant's goods in return for compensation (preferably a performance-based commission). Typically, this site is owned and operated by an individual or business entity ("associate") that is not in the same business as that of the merchant. For example, in the context of the AMAZON.COM Associates Program, the associate may be an individual that is in the business of rating mystery novels.

As described below, because the merchant handles the tasks of processing online orders, shipping products, collecting payment, and providing customer service, the associate need not be concerned with these tasks. Thus, the associate can effectively become an online retailer immediately, by simply enrolling as an associate and setting up a Web site.

In addition, because the merchant Web site 106 includes software for automating the primary functions of doing business with associates (such as associate enrollment, referral transaction processing, and commission tracking and payment), the architecture allows the merchant to do business with large numbers (e.g., thousands) of associates with minimal supervision by the merchant. Further, because the commissions paid to the associates are performance-based, there is little or no downside to the merchant to enrolling marginally-productive associates that provide relatively small numbers of referrals.

In operation, the customer accesses the associate's Web site 100 using a standard Web browser 112, such as Microsoft's Internet Explorer or Netscape's Navigator, which uses the HTTP protocol to communicate with a Web server 116 of the associate's site 100. The Web server 116 accesses a local store of catalog documents 120 (in the form of HTML or "Web" documents) which can be requested, retrieved and viewed by the customer via the Web browser 112. These catalog documents 120 include information generated by the associate about the various products featured on the associate's Web site 100. Preferably, this information includes editorial descriptions, reviews, and/or recommendations of the products that assist customers in making informed purchasing decisions.

The catalog documents 120 served by the associate's site 100 include special hyperlinks (to Web pages of the merchant Web site 106) for allowing consumers to select products for prospective purchase. Typically, one such hyperlink is provided for each product displayed on the associate's Web site 100. Alternatively, a hyperlink may be provided for a group of products. When a customer selects (e.g., clicks on) the hyperlink associated with a particular product, the customer is automatically connected to the merchant Web site 106, and presented with various options (included within Web pages 136 served from the merchant Web site 106) for allowing the customer to purchase the selected product from the merchant. The hyperlink thus serves as a referral mechanism for referring the customer to the merchant Web site 106.

As described in detail below, the special hyperlinks (also referred to herein as "referral links") of the associate's catalog documents are provided in association with additional information (embedded in a pre-defined format within the associated URL) that is transmitted to the merchant Web site 106 in response to selection of the link. In one implementation, this information includes a unique identifier of the associate (assigned upon enrollment) and a unique identifier of the selected product (such as the ISBN of a book). A computer program 144 of the merchant Web site 106 uses this information to identify the associate that was the source of the referral, and to credit the sale (referral) to the associate if the customer subsequently purchases the product (or group of products). (In other implementations, the crediting of the associate may occur without regard to whether the product is purchased.) Commission payments can then be paid to the associates on a periodic basis (such as once a month). In one implementation, the commission payments are made electronically, via the computer program 144, without the need for involvement by the merchant.

In one implementation, the merchant Web site 106 comprises a product information database (not shown) that stores product pricing information. The computer program 144 of the merchant site 106 uses this pricing information to calculate the proper commission or referral payment.

Although the implementation described herein uses monetary commissions to compensate the associates for referrals, other forms of compensation can be used. For example, an associate (and/or the associate's customers) could be given a discount on products or services sold by the merchant.

In one implementation of the merchant Web site 106, selection of a referral link causes a product detail page 136 to be displayed on the customer computer 108. This detail page 136 is served by the merchant Web site 106, and includes various information provided by the merchant (price, inventory, standard product description, etc.) about the selected product. From this page, a hyperlink can be selected that allows the selected product to be added to a customer "shopping cart."

The shopping cart is a customer-specific data structure that is generated and maintained (within a shopping cart database 152) by executable code of the merchant site 106. The database may be any type of data repository including, for example, an SQL table or ASCII text file. The information stored within the shopping cart includes a list of the products that have been selected by the customer for prospective purchase, together with an identifier of the referring associate (if any) corresponding to each such product. In one implementation, each shopping cart persists on the site 106 for an extended period of time (such as one week) following the most recent access by the customer, allowing the customer to conduct extended shopping sessions. When the customer proceeds to a check-out area of the merchant site 106 and submits an order for the selected products, the associate identifiers stored within the customer's shopping cart are used to appropriately credit the accounts of the referring associates. Although the shopping cart implementation provides an efficient mechanism for tracking and crediting referral events, referrals can alternatively be credited without the use of a shopping cart, such as by crediting the associate at the time of, or during the same shopping session as, the referral.

Because the identity of the customer is normally unknown to the merchant Web site 106 at the time of the referral event, the site 106 uses cookies technology to identify the customer, so that the customer can be associated with any existing shopping cart created during previous visits to the site 106. This process involves retrieving the cookie 140 from the customer computer 108 with the Web server 132, and then executing a computer program 144 that compares the cookie against information stored in a customer data structure 148. If no shopping cart exists for the customer, or if no cookie exists on the customer computer 108, a shopping cart structure is created for the user. Any of a variety of alternative techniques can be used to identify the customer, including prompting the customer for a user ID, and/or using URL information returned by the customer's Web browser.

Although the embodiment described herein uses Web technology to disseminate the catalog documents, any of a variety of document types and electronic dissemination technologies can be used. For example, the associate's catalog documents may be in the form of hypertextual e-mail messages that are disseminated by a list server, or PUSH documents disseminated by a PUSH server. As interactive television, video-on-demand, and Web TV technologies continue to evolve, it is contemplated that the "catalog documents" will include video advertisements that are displayed to the customer on a television screen. Further, although hypertextual catalog documents are preferably used, it is possible for an associate to use non-hypertextual catalogs (including paper-based product catalogs) that simply instruct the customer to manually enter the appropriate URL (including the referral information) into a browser program.

In addition, although the system is described in the context of "the" associate's Web site, it should be recognized that a given associate can disseminate its catalog documents (using the single associate ID assigned during online registration) from multiple different sites, including sites that use different document formats and transfer protocols. Further, although the system is described herein in the context of a merchant that sells products, it will be recognized that the architecture can also be used to sell services, including online services that are provided over the Internet.

As will be appreciated by those skilled in the art, the use of the URL-embedded referral information to identify the associate allows the associate to be identified, and properly credited for the referral, with a high degree of reliability. For example, in contrast to conventional user tracking techniques, the present method allows the associate to be reliably identified even if the associate Web site 100 operates behind a firewall. In addition, the method provides a high degree of flexibility to the associate. For example, the associate can change to a different Internet service provider, and can use or switch between multiple catalog dissemination techniques (Web, e-mail, PUSH, etc.), without affecting the ability of the merchant Web site 106 to identify and credit the associate. Moreover, the associate can freely modify its product offerings—without the need for involvement by the merchant—by simply updating product descriptions and corresponding referral links within the catalog.

A significant benefit of the architecture is that it allows the task of marketing the merchant's products to be efficiently distributed among entities that have established reputations and exposure within their respective fields. In the context of the AMAZON.COM Internet bookstore, for example, a well-established computer company can set up an associate site (or an area of an existing site) to recommend its favorite books on programming languages; and an Italian chef can set up a site to recommend his favorite cookbooks on Italian cooking. In implementations that involve sales of other types of products (such as audio/video equipment), the associates may, for example, include testing laboratories that publish test results.

Because the associate enrollment and referral tracking functions are automated (in whole or in part), the referral services provided by the associates take place with little or no human supervision or intervention by the merchant. In addition, because the payments to the associates are performance-based (e.g., based on the number of sales resulting from associate referrals), the merchant need not be concerned with the effectiveness of any given associate site.

The system and method also provide an efficient mechanism for exposing the merchant and the merchant Web site 106 to the public by encouraging others (associates) to set up outgoing links to the merchant's Web site. For example, this may be beneficial where the merchant Web site 106 is configured to support direct sales (i.e., sales that do not involve referrals from associates), as is this case with the site of AMAZON.COM.

The various components and functions of the referral system are described in further detail below.

3. Associate Enrollment Function

As indicated above, the merchant Web site 106 includes automated enrollment software (FIG. 1) for allowing an entity to apply, via the Internet, to operate as an associate. The registration process may include the following: (i) the presentation of an online business agreement to the applicants, (ii) the use of an automated "agent" to scan the application text for key inputted terms, including vulgarities and other terms that may serve as a basis for denying the application, (iii) the automated generation and assignment of a unique associate ID (also referred to herein as the "store ID") to an applicant, and (iv) the automated electronic transmission of referral link embedding instructions to the applicant.

FIG. 2 illustrates the general flow of information between components when an associate applicant uses a computer 200 to enroll as an associate. The computer 200 includes a conventional Web browser 204 which communicates with the merchant Web server 132 using the HTTP protocol. The Web server 132 accesses a local store 136 of HTML documents (Web pages) which can be requested, retrieved and viewed by the applicant via the Web browser 204. These documents may, for example, include information about registering online to become an associate. Access to the merchant Web site 106 and the enrollment function is available to any client computer 200, and the enrolling associate is not required to have an established Web site at the time of enrollment.

As further illustrated in FIG. 2, the enrolling associate begins the enrollment function by selecting the proper hyperlink from the merchant Web page 136 containing online registration instructions. The merchant Web server 132 accesses a local store of HTML documents 136 and returns an online registration application document 208 (also shown in FIGS. 3a–3c) to the enrolling associate's Web browser 204. The enrolling associate can then fill out the detailed online application form 208.

Figure 3A:

Referring to FIGS. 3a–3c, a preferred embodiment of the online application form 208 is shown. The application requests information about the enrolling associate, including the Web server to be used for the associate's Web site, the associate Web site's descriptive name, and the e-mail address of the enrolling associate. Many alternative formats to the online application form are possible and FIGS. 3a–3c are only representative of the types of information that may be requested.

With further reference to FIG. 2, once the electronic application form 204 is completed by the enrolling associate, it is sent from the associate's computer 200 to the merchant Web server 132 for further processing. As will be appreciated by those skilled in the art, other forms of enrollment processing may be used, including but not limited to regular mail and electronic mail. In addition, although the automated enrollment function is preferably handled by the same computer system that handles the referral processing function, these functions could be performed by dedicated, physically distinct computer systems or sites.

In response to submission of the enrollment form, the merchant Web server 132 initiates a computer program 144 comprising enrollment software that processes the information contained on the electronic application form 208. In one implementation, an agent is used to scan the application text for pre-specified terms, and to flag the application for further review (such as by a staff member) if such a term exists. If no such term is found, and the application is complete, the enrollment software automatically accepts the application.

As part of this online registration, once the application has been processed (either automatically or with human intervention), the enrollment software generates a unique store ID to be assigned to the associate. In addition, the enrollment software creates a database entry corresponding to the enrolling associate and stores the store ID and the information provided by the enrolling associate as a unique entry in an associate database 160. The database may be any type of data repository including, for example, an SQL table or ASCII text file. This database entry allows the merchant Web site 106 to properly track and credit associate referrals, as further described below.

Next, the computer program 144 automatically formats and transmits an electronic mail message to the e-mail address of the approved associate. This electronic mail message provides detailed information about setting up an associate's Web site, including instructions on how to create HTML documents with referral links. These instructions specify a predefined format for embedding the store ID and unique product IDs with the HTML link structures. In addition, the e-mail message includes the unique store ID (generated by the enrollment software), and includes instructions on obtaining unique product IDs. The associate can obtain the unique product IDs by browsing the merchant Web site 106. Alternatively, the unique product IDs may be obtained by the associate through a specific electronic mail request, or may be provided by the merchant Web site when the initial electronic mail response is sent. A preferred set of linking instructions that are sent to new associates is included as Appendix A.

Figure 4:
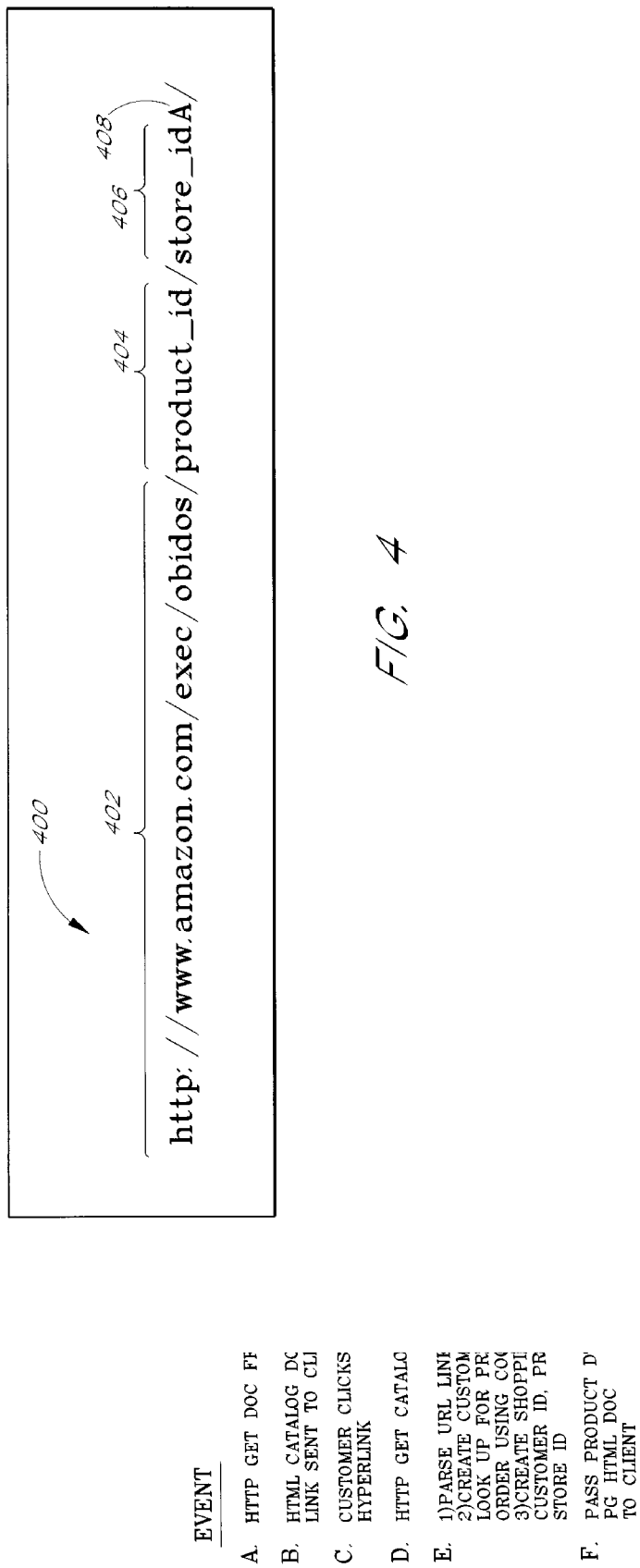
FIG. 4 illustrates a URL format used to embed referral links within Web documents in accordance with the invention.

FIG. 4 illustrates a preferred format of a URL 400 used by an associate to create a referral link to the merchant Web site. This format is recognized by parsing software (FIG. 1) that runs on the merchant Web site. The URL 400 comprises the merchant Web server information 402, the unique product ID 404, the unique store ID 406, and an associate commission scheme ID 408. The unique store ID 406 represents the information created and stored in the associate's database during the associate enrollment process described above. In the AMAZON.COM implementation, the unique product ID 404 is the ISBN of a book that is available from the AMAZON.COM Web site. The associate commission scheme ID is an optional feature that can be used to specify a commission percentage or method for calculating the referral commission.

Upon receipt of the special linking instructions, the associate can begin to build the content (catalog documents) of the associate's Web site, including the descriptions of the products to be featured on the site. An associate can begin to refer customers to the merchant Web site 106 at anytime; however, no credit may be given to the associate for referred customers until the associate has included properly-formatted referral links within its product catalog. Additionally, referral credit may be withheld if the merchant has not yet authenticated and qualified the associate Web site for business.

4. Referral Transaction Function

Figure 5:
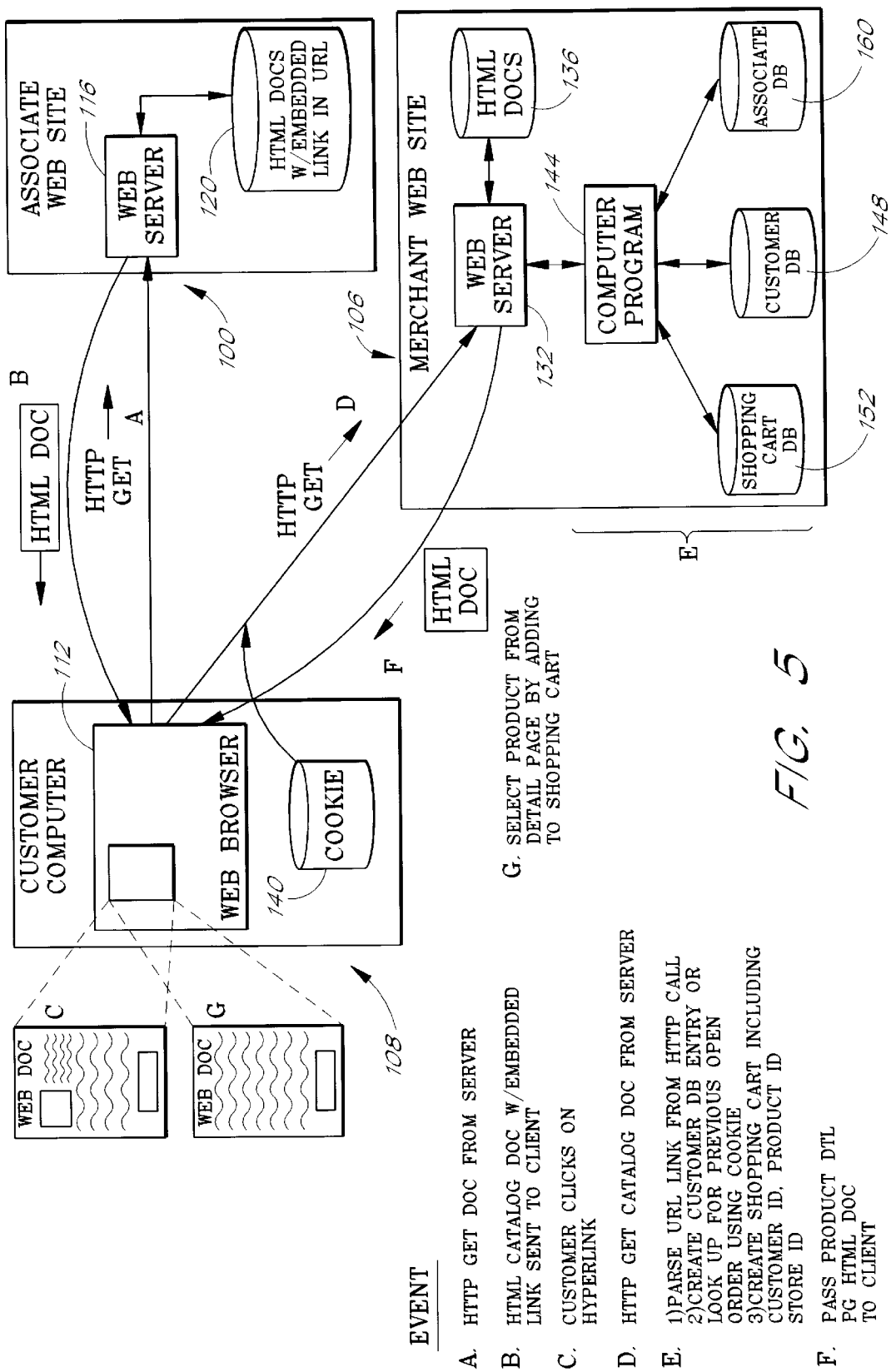
FIG. 5 is an architectural drawing and flow diagram illustrating a referral transaction sequence in accordance with the present invention.

A preferred method for processing referral events will now be described with reference to FIGS. 5–7. Referring to FIG. 5, which depicts an example sequence of events, a customer accesses an associate's Web site 100 via the customer computer 108. The customer computer 108 includes a conventional Web browser 112 which communicates with the associate's Web server 116 using the HTTP protocol. As depicted by events A and B, the Web server 116 accesses a local store of catalog documents 120 (Web pages) which can be requested, retrieved and viewed by the customer via the Web browser 112. As described above, these catalog documents 120 include information about the various products featured at the associate's Web site 100. Preferably, this information includes editorial descriptions, reviews, and recommendations generated by the associate.

Figure 6:
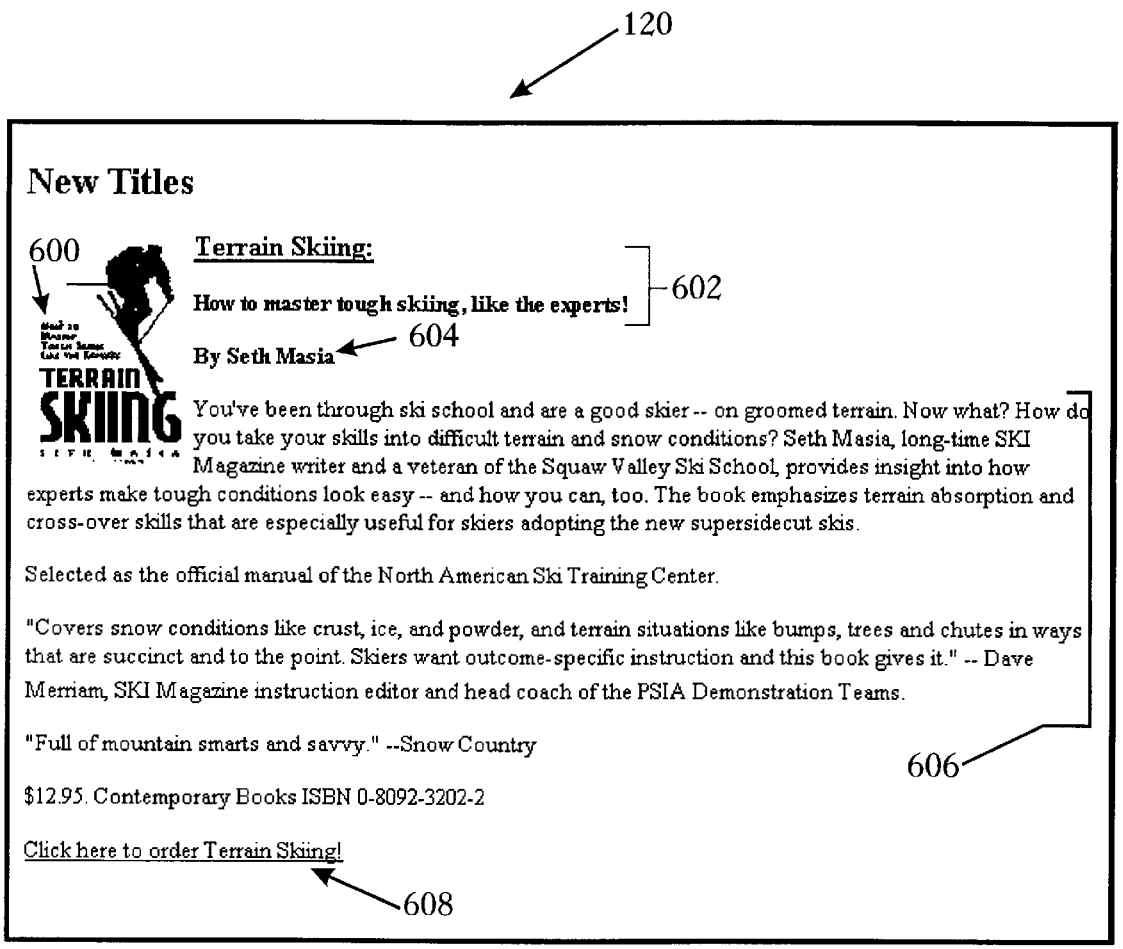
FIG. 6 is a screen display illustrating an HTML catalog document of the associate's Web site.

FIG. 6 illustrates an example HTML catalog document (Web page) 120 in accordance with the present invention. The customer views the product catalog document 120 via the Web browser 112 in order to select a particular product (book) offered through the associate's Web site 100. In this example, the catalog document 120 comprises a graphic icon 600 that is a scaled-down replica of an actual book cover. The graphic icon 600 also functions as a hyperlink, allowing the customer to click on the icon with a mouse in order to link to the merchant Web site 106. The document 120 includes the title 602 and author of the book 604, and includes an editorial description and recommendation of the book 606 from the associate. The catalog document 120 also contains another textual hyperlink 608, allowing the customer to link to the merchant Web site 106 and initiate referral transaction processing. Typically, the associate's product catalog (which may include multiple catalog pages) contains several referral links (with different product IDs), each corresponding to a different product sold by the merchant.

FIG. 7 is an HTML source code listing which illustrates a preferred format for including a referral link within an HTML catalog document. The source code of FIG. 7 corresponds to the product catalog document 120 illustrated in FIG. 6. In this example, the referral link (included between the HTML anchor tags "A" and "/A") consists of the URL http://www.amazon.com/exec/obidos/ISBN=0809232022/skinetA/ and the corresponding textual description "Click here to order Terrain Skiing!." The URL is identified as such by the standard HREF (hypertext reference) tag. The portion of the URL preceding "skinetA" uniquely identifies a product detail page (of the AMAZON.COM site) of a book having an ISBN of 0809232022. As described below, the "skinetA" portion of the URL identifies both the referring associate and a commission scheme. The referral link is included within the document such that selection by the customer of the text "Click here to order Terrain Skiing!" causes the Web browser 112 to transmit the URL on the Internet 104 via a standard HTTP message.

Further referring to FIG. 5, upon clicking or otherwise selecting the referral link 608 of the associate's catalog document 120 (event C), the Web browser 112 communicates with the merchant Web server 132 (events D–F) to access HTML documents 136 of the merchant Web site 106. Initially, the customer is shown a product detail page that provides detailed information about the selected product, and allows the customer to add the selected product to the shopping cart (described below). The Web server 132 also serves Web pages (including dynamically-generated pages) that display and allow the customer to edit the contents of the shopping cart, and that allow the customer to proceed to a check-out area to order the selected products.

Once the customer has linked to the merchant Web site 106, the customer can use the navigational controls of the Web browser 112 to return to the associate's Web site 100. In addition, the detail page and/or the shopping cart page may be provided with a hyperlink to allow the customer to return to the associate's Web site 100. Another alternative is for the associate Web site 100 to be created using an HTML frame format. The bottom frame can be designated as the target area frame for the merchant's Web site 106. The top frame can provide navigational controls for the customer to return to the associate's Web site 100 after selection of a particular product at the merchant's Web site 106. This allows the customer to maintain an associate's Web page frame while viewing and processing product purchases at the merchant's Web site 106.

Following the referral event, the customer can browse the merchant Web site 106 for additional products, and can add these products to the shopping cart. In one configuration option, the referring associate is given commission credit for all additional products thereafter selected (during the current browsing session) from the merchant Web site 106, assuming the customer subsequently purchases these products. In another configuration option, the associate is only credited for the purchase of the product that was the subject of the referral.

The sequence of events that takes place when the customer clicks on the referral link 608 will now be described in greater detail. Before the product detail page 136 is sent to the customer's Web browser 112, the merchant Web server 132 initiates a computer program 144 to conduct several processing steps. As depicted by event E1 in FIG. 5, the computer program 144 executes parsing software (FIG. 1) to parse the URL passed to the merchant Web server 132. The parsing software extracts the unique product ID (ISBN), the unique store ID associated with a particular associate, and an optional associate commission ID from the URL data string. For example, if the URL string is http://www.amazon.com/exec/obidos/ISBN=0809232022/mystoreA/, the parsing software parses the string to extract the unique product ID (ISBN) of 0809232022, the unique store ID of "mystore," and the commission ID of "A." In one implementation, the software 144 uses the commission ID to calculate an appropriate commission (e.g. 10% of merchant's sales price) to apply to the associate's account. As described below, if the customer subsequently adds the selected product to the shopping cart, the extracted information is recorded within a shopping cart data structure that corresponds to the customer.

5. Unified Shopping Cart Function

As discussed above, the present invention provides a system for maintaining a unified shopping cart that stores product information associated with product referrals from multiple Web sites, and keeps track of the sources (associates) of such referrals. One benefit of this feature is that it enables the customer to perform a single "check out" to purchase products from multiple Web sites. Additionally, this feature allows the merchant Web site 106 to accurately track and credit each associate, on a per-product-sale basis, that has referred a customer. For example, if, upon "checkout" from the merchant Web site 106, the customer has three books listed in the shopping cart, each of which resulted from a referral from a different associate Web site, each associate will be credited for its respective referral. While the shopping cart feature is particularly useful in the context of the disclosed referral system, the feature can also be applied to other types of Internet shopping systems that support shopping from multiple Web sites, including systems that use remote "agents" to monitor Web sites based on pre-specified selections of the customer.

The data structures and processing steps that implement the shopping cart will now be described with further reference to FIG. 5. As indicated above, the shopping cart maintains a customer-specific record of the products that have been selected by the customer, including the identities of any associate Web sites that acted as referral sources with respect to such products. Preferably, the computer program 144 maintains this information in a data structure that is stored on the Web site 106 for an extended period of time (such as one week) since the last access to the shopping cart by the user. This allows the customer to discontinue and later resume a shopping session without loss of the shopping cart data.

Upon customer selection of a referral link, the computer program 144 utilizes the customer cookie information 140 passed through an HTTP call to determine whether the particular customer (or technically, the customer computer 108) already has an open shopping cart (event E2). As part of this process, the computer program 144 executes cookie processing software (FIG. 1), which assigns a unique customer ID to the customer based on the cookie information 140. If the customer's Web browser 112 does not support the use of cookies (or if the cookies feature is disabled) the program 144 uses URL information received from the Web browser to generate the customer ID.

The customer ID is in turn used by the software 144 to identify any shopping cart currently associated with the customer. If no shopping cart exists for the customer, a new shopping cart structure (which includes the customer ID) is generated within the shopping cart database 152. The customer ID is also stored in a customer database 148. The algorithm used by the program 144 to generate the customer IDs is such that a cookie retrieved from the same customer computer will consistently produce the same customer ID. Thus, assuming the customer always uses the same computer to access the merchant site 106, and that the browser 112 supports the use of cookies, the customer will be assigned the same customer ID, and will be associated with any existing shopping cart.

In one implementation, once the customer has been referred to the merchant site 106 and the customer ID has been determined, the merchant site dynamically includes this ID within hyperlinks of the detail page and other Web pages that are sent to the customer computer 108. When the customer subsequently selects such a link (such as to add a selected product to the shopping cart), the customer ID is automatically transmitted to the merchant site 106 as part of the HTTP message. This allows the merchant site 106 to identify the customer (and shopping cart) without the need to re-request the cookie from the customer computer.

During the process of displaying detail pages and allowing the customer to add products to the shopping cart, neither the merchant site 106 nor the associate sites have access to the customer's personal information (name, address, credit card number, etc.). Thus, the system advantageously allows the customer to shop anonymously. Only when an order is actually submitted does the merchant site 106 obtain access to the customer's information, and at no time is the information provided to the associate sites.

With further reference to FIG. 5, the shopping cart is stored as a table or data structure within the shopping cart database 152, along with individual product selections made by customers. If the customer has an existing shopping cart, the computer program 144 will create another product selection entry within the shopping cart database 152, as indicated generally by event E3. If the customer does not have an existing shopping cart, then the computer program will create a new shopping cart data structure within the shopping cart database 152. The product selection entry within the shopping cart database 152 includes the store ID and product ID. If a product is selected directly from the merchant Web site 106, the corresponding store ID field may be blank or encoded with merchant-specific information. Other information may be stored in the shopping cart to implement the specific business procedures of the particular merchant.

When the customer subsequently purchases a product or products contained in the shopping cart, the associate's unique store ID maintained in the associate data structure 160 is used to appropriately credit the associate's account. During this process (or at the time of the referral) the computer program 144 determines whether the store ID represents a valid (enrolled) associate in the associates database 160. The processing at the merchant Web site 106 maintaining the associate's store ID in the shopping cart allows the system to obtain pricing information for a product and associate. In this way, the computer program 144 can be configured to generate special discounts or pricing incentives to the customer or associate depending on a particular business relationship.

The shopping cart stored in the shopping cart database 152 is maintained by the computer program 144 running at the merchant Web site 106 that monitors the open entries (non-closed shopping carts) in the shopping cart database 152. The shopping cart database 152 includes the customer ID, the date the shopping cart was opened (open date), and the date last accessed (touch date). The shopping cart database is monitored by the computer program 144 to purge all shopping carts that have been inactive (untouched) for a pre-defined period of time, such as one week.

Figure 8:
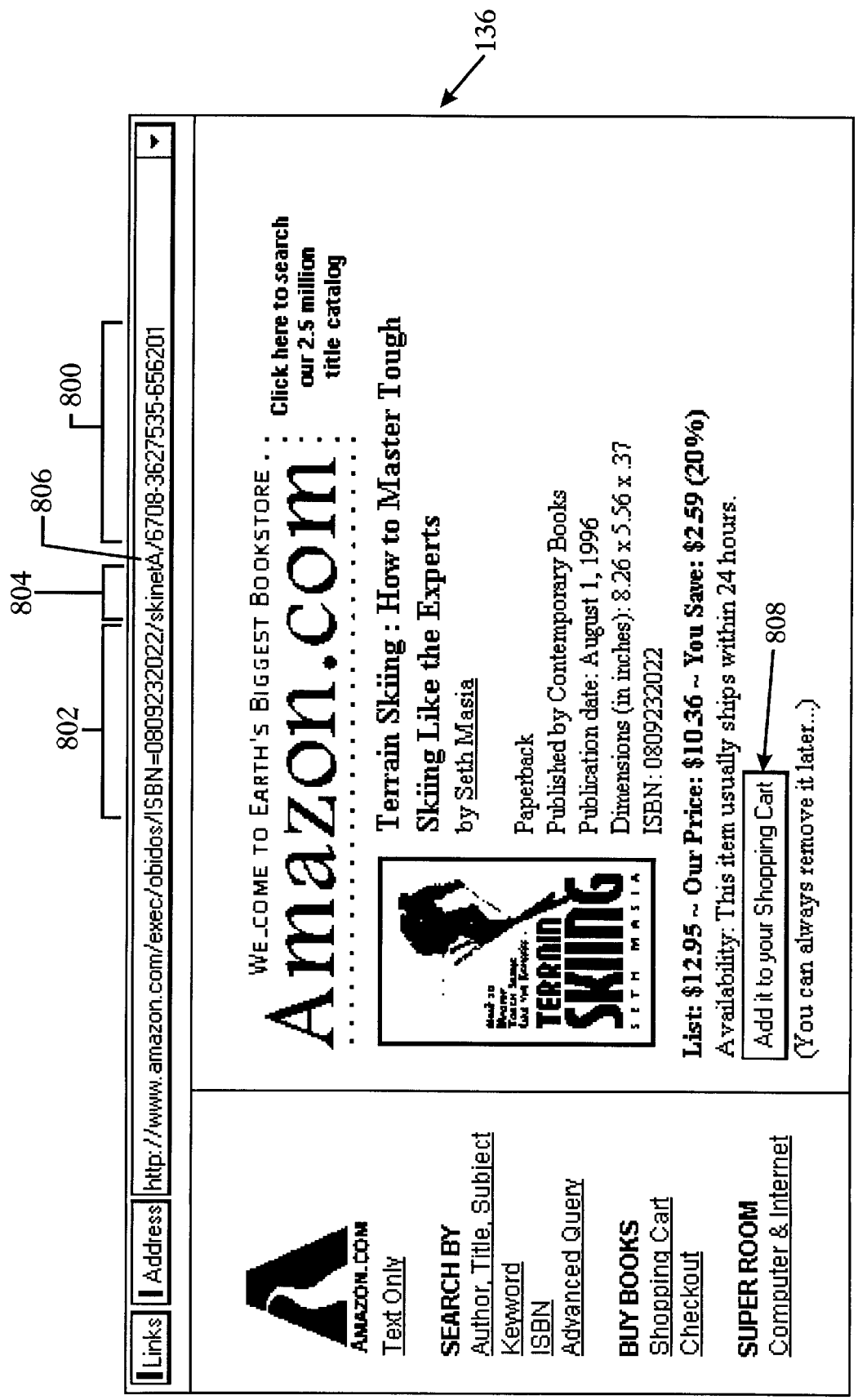
FIG. 8 is a screen display illustrating an HTML catalog document detail page of the merchant Web site.

FIG. 8 illustrates an example of an HTML catalog document (Web page) 136 corresponding to the product detail page. After processing a referral URL, the merchant Web server 132 sends the detail page 136 to the customer's Web browser 112 to provide the customer with additional information about the selected product. The product detail page includes the merchant's information (price, standard description, etc.) about the selected product. The product detail page 136 is shown with the URL passed to the customer Web browser 112 from the merchant Web server.

The URL (shown at the top of FIG. 8) comprises the unique customer ID 800 (obtained from the customer's cookie or URL information), the product ID 802 (shown as the ISBN of the Terrain Skiing book), the store ID 804 (shown as the "skinet" Web site), and the associate commission ID 806 (the letter "A"). Once the customer has reviewed the product detail page 136, the customer can select the "Add it to your Shopping Cart" hyperlink 808. When the customer clicks on this hyperlink 808, the merchant Web server 132 returns a dynamically-generated HTML document that displays the contents of the shopping cart.

Figure 9:
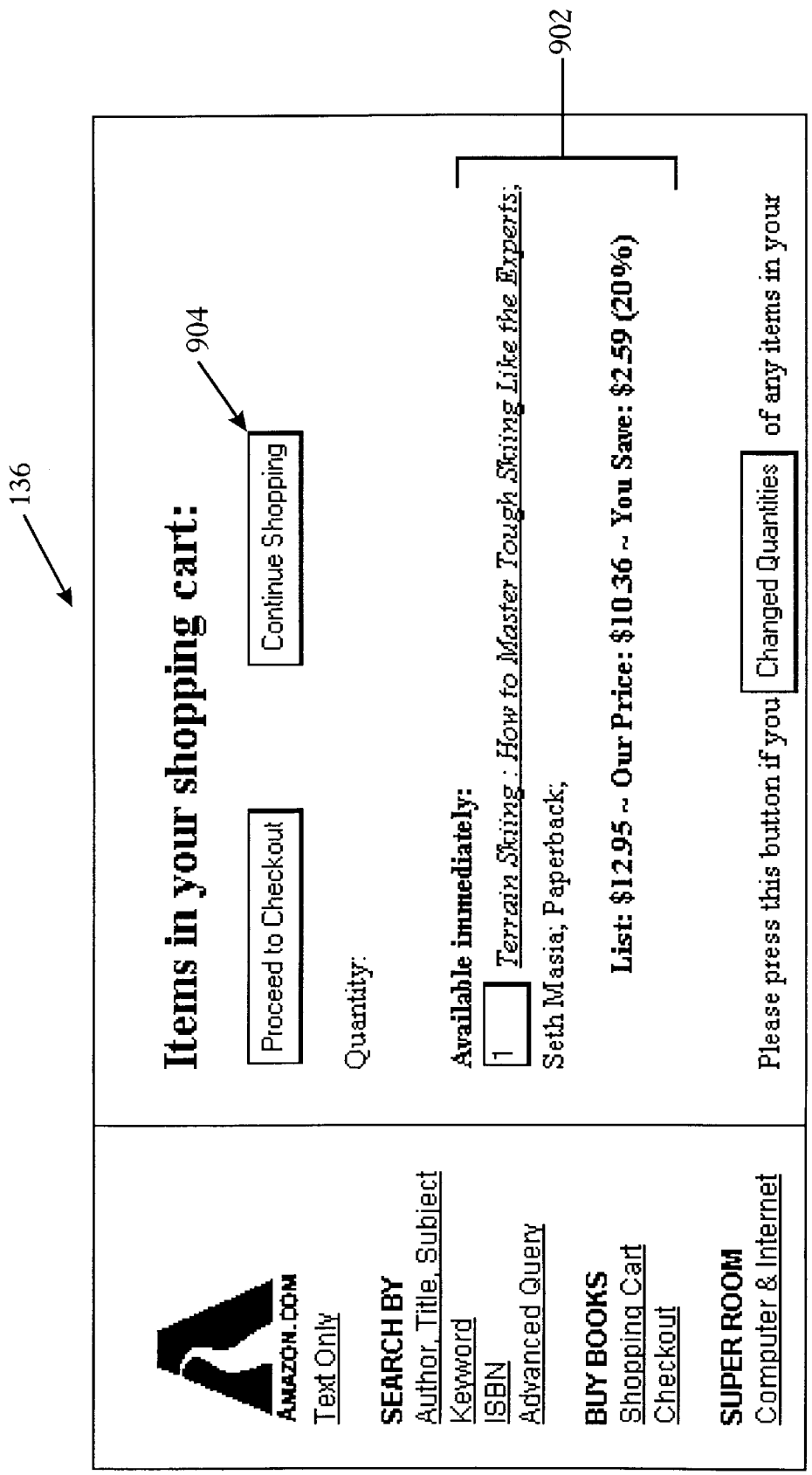
FIG. 9 is a screen display illustrating a preferred shopping cart processing method in accordance with the present invention.

FIG. 9 illustrates an example HTML document 136 (Web page) corresponding to the customer shopping cart. The customer shopping cart document 136 displays information about the products currently selected by the customer for prospective purchase. In this example, the selection item 902 is displayed to the customer as the "Terrain Skiing" book previously selected. From this page 136, the customer may leave the shopping cart page, without proceeding to checkout, by either selecting the "continue shopping" link 904 or by using a Web browser navigational control to proceed to a different Web page.

Figure 10C:

FIG. 10*a* represents another associate's Web site where the customer can view products featured with editorial comments. For purposes of this example, it may be assumed that the customer proceeded directly to this site (e.g., by selecting a "favorite places" URL) from the shopping cart page of FIG. 9. If the customer selects the hyperlink 1000, the merchant Web server returns the product detail page for the "Cooking with Daniel Boulud" book, as illustrated in FIG. 10*b*. The customer may then add this book to the shopping cart by selecting the "Add it to your Shopping Cart" hyperlink 1002, and the customer will then be brought to the shopping cart Web page illustrated in FIG. 10*c*. The shopping cart now has product selection items corresponding to the two books selected by the customer during the shopping session, and each of these product selection items is stored in the shopping cart database to uniquely identify the respective associate that made the referral. When the customer selects the "Proceed to Checkout" hyperlink 1004 on the shopping cart Web page, the merchant Web site returns a form document (not shown) that allows the customer to specify payment information, shipping information, and other information needed to process the order.

As illustrated by the above example, one customer shopping cart can have line items (corresponding to book selections) from many different associate Web sites. In addition, the shopping cart can include line items of books that have been selected directly from the merchant. As described above, because the shopping cart keeps track of each referral, the referring associates can efficiently be credited for their respective referrals upon order submission, without the need for the customer to perform multiple "check-outs."

The merchant Web site includes credit generation software for calculating associate referral credit. Referral credit may be calculated in any of a number of ways depending on the associate and merchant business relationship, and may be provided to the associate on a periodic basis, such as at the end of each calendar quarter. For example, the associate may be paid a fixed percentage of the list selling price. As indicated above, commission payments may be made automatically using an appropriate electronic payment method.

As will be appreciated from the foregoing, the shopping cart feature of the system enables the customer to view the entire shopping experience as a seamless, automated shopping session. The seamless nature of the session allows the customer to shop for products based on the marketing expertise of the associates, while conveniently utilizing the merchant's order fulfillment resources.

6. Report Generation Function

The merchant Web site also preferably includes report generation software (FIG. 1) that automatically generates and transmits associate feedback reports to respective associates, based on information stored by the merchant Web site. The software can be configured to generate the reports on a daily, weekly, monthly and/or annual basis. The information contained within these reports enables the associates to evaluate the effectiveness of their Web sites on a per-product basis.

One report produced by the AMAZON.COM site is the "Weekly Activity Report." An example of such a report is included as Appendix B. This report provides information about the number of books ordered through the associate's referral links, the number of selections (hits) of each referral link, and the amount of referral credit earned on orders in the time period.

Various other types of information can be provided within the feedback reports to assist the associates in conducting business. For example, the reports can provide anonymous demographic data about the customers that made purchases from the associate site, including the geographic regions (as determined from shipping addresses) of such customers. Additionally, the reports can provide special notices, including notices about books that pay lower referral credit to associates, and any problems occurring with an associate's referral links. The report generation feature also may provide associates with the ability to access an on-line menu to generate custom feedback reports (such as a report of the number of referrals during a specific period of time), or to set up a report profile that specifies the content, format and frequency of the automated reports.

7. Conclusion

While the invention has been described herein with reference to certain preferred embodiments, these embodiments have been presented by way of example only, and not to limit the scope of the invention. Accordingly, the scope of the invention should be defined only in accordance with the claims that follow.

In the following claims, reference characters used to designate claim steps are provided for convenience of description only, and are not intended to imply any particular order for performing the steps.

APPENDIX A

Date: Tue, 24 Jun 1997 02:11:28 -0700 (PDT)
To: mystore@aol.com
Subject: Amazon.com Books: Thank you for your application
Cc: associates@amazon.com
Thanks for submitting your application to participate in the Amazon.com Associates Program. Your application has been temporarily approved. We'll contact you by e-mail once we have reviewed and approved your application.
*Important*: Be sure to save this email message--you will need some of the information here to properly set up your links to Amazon.com.
You can set up your Web site now. You have been assigned a unique Associates ID. You'll use this ID when linking your sponsoring Web site into our catalog; detailed instructions are included at the end of this message.

APPENDIX A-continued

Your unique Associates ID is: mystore.
USING THE AMAZON.COM BRAND NAME
-----------------------------
As you may already know, Amazon.com has received a great deal of very positive press coverage since we opened. From The Wall Street Journal, Newsweek and the Associated Press to PC Magazine and WebWeek, mainstream and industry press alike have helped to make the Amazon.com brand name one of the more well-known among Internet sites.
Our extensive advertising campaign reaches users of many major Web services and search tools, and our printed ads are found in places like the New York Times Review of Books. You should consider using not only our name but one of the logos or banners found on our site at:
    http://www.amazon.com/exec/obidos/subst/assoc-art.html
so that your visitors have the chance to recognize our name as a familiar and trustworthy Internet retailer working in association with you.
SUGGESTIONS FOR SUCCESSFUL PRESENTATION:
----------------------------------------
We've put a page on our Web site filled with suggestions for building a great online bookstore. These tips are taken from our most successful Associates, and we highly recommend reading them. Follow the link on our home page to "Build Your Own Bookstore", and from there link to "Build a Great Bookstore". You can also connect directly at this URL:
  http://www.amazon.com/exec/obidos/subst/assoc-success-tips.html
HOW TO LINK INTO OUR CATALOG:
-----------------------------
You can use any sort of book descriptions, review material and graphics that you like when describing books on your Web site. All we need is a separate link into our catalog for each book you wish to recommend. You may add or remove these links at any time without our prior approval; as long as they follow the prescribed format we'll detect them automatically when they are used.
Each link to our catalog will be the same except for the ISBN of the book.
You'll see the "isbn=" part of the link at the end of each example below. To find the ISBN of the book you wish to list, use our Web site and search
for that book with any of our search tools. The ISBN for each edition (hardcover, paperback, book on tape) is displayed on the detail page for that book.
Remember--you may change which books you list whenever you like. You won't need our permission and it's not even necessary to advise us of the changes--they'll be automatically detected and commissioned properly.
EXAMPLE:
--------
For each book you recommend, link it to us like this:
http://www.amazon.com/exec/obidos/ISBN=1234567890/mystoreA/
Note: You *must* use a capital A at the end of this link, not a
    lower-case a.
Of course, the ISBN will change for each book. Do not include any spaces
or dashes in the ISBN when making these links. Also, make sure to check our catalog first--we can only sell what's listed there.
VERY IMPORTANT: If you copy the URL of a book page from our Web site and modify it to fit the format above, be sure to remove the 19-character shopping cart ID that appears at the end of the bookmarked or
copied URL. Your store code should immediately follow the ISBN as in the example above. If you leave this in your modified links, they will not work properly.
------------------------------------------------------------------
The information we have about your Web site is as follows:
Contact e-mail Address:
    mystore@aol.com
Contact address:
    John Doe
    1234 East Road
    Anytown
    WA
    12345
Payee e-mail address:
    mystore@aol.com
Payee address:
    Doe Enterprises, Inc.
    1234 East Road
    Anytown
    WA
    12345
Description of books you intend to list:
Business Books - How to Business Books Sponsoring Web site name:

Sponsoring Web site URL:

Your Web site name, in the format we may use on our website:
    Mystore - Anytown, WA in association with Amazon.com Books
-------------------------

If you have any questions, you can e-mail us at associates@amazon.com and we'll be happy to help.

Once again, thanks for your application.

Sincerely,

Associates staff

Amazon.com Books http://www.amazon.com/

2.5 million titles, consistently low prices

APPENDIX B

Amazon.com Associates Program
Weekly Activity Reports
Every week, we e-mail our Associates a detailed activity report so that they can track the effectiveness of their efforts. A sample of the report shows what you can expect to receive weekly:
Sample Weekly Activity Report
Last Week's Sales Results
--------------------------------------------------------------------------
Note: This report includes a column labeled "ORDERED," which is the weekly number of copies for which orders have been placed through your special links. Only after these orders are paid for and shipped will they actually count toward your referral fee. Some of these orders may later be canceled, customers' credit cards may be declined, and occasional returns should be expected; in any of these cases, the referral fee will not be earned.
The column labeled "HITS" represents the number of times one of your visitors clicked on a book (this column can help you gauge your visitors' interest in the books you are selling).
The column labeled "REFERRAL FEE" represent the referral fees your site has earned on orders. Please remember that we pay you based on orders *shipped*, so your actual Referral Fee may be somewhat lower than the fee stated here.
Look for special notices in the titles listed below. They can help you track books that may not pay referral fees and identify certain problems with the
link format you may be using
1 indicates that this item is currently being featured at a discount of
    more than 30%.
2 indicates that this item is "special order" or carries no discount
Other notes may indicate problems with a link format or items no longer carried in our catalog.
Quarter-to-Date Books Ordered:              105
Quarter-to-Date Qualified Book Revenue:    4266.46
Quarter-to-Date Referral Fees:              519.04
Click-throughs and sales by individual book for the week of 12-Jan-97 through 18-Jan-97
Store ID mystore

| ISBN | HITS | ORDERED | YOUR FEE | TITLE |
|---|---|---|---|---|
| 0534517072 | 4 | 2 | 1.70 | 2 Earth Online: An Internet Guide 2 sold at 0% off list price of 16.95 |
| 0672309599 | 3 | 0 | 0.00 | Microsoft SQL Server 6.5 Dba Survival G |
| 0764530038 | 2 | 0 | 0.00 | Danny Goodman's JavaScript Handbook |
| 0789704927 | 355 | 11 | 65.99 | Building Delphi 2 Database Applications 11 sold at 20% off list price of 49.99 |
| 0789704943 | 2 | 0 | 0.00 | Using VRML |
| 0789707500 | 1 | 0 | 0.00 | Delphi 2 Tutor: The Interactive Seminar |

APPENDIX B-continued

| | | | | |
|---|---|---|---|---|
| 1568302894 | 110 | 6 | 8.10 | 1 Creating Killer Web Sites: The A sold at 40% off the list price of 45.00 |
| Totals: | 477 | 19 | 75.79 | |

| | |
|---|---|
| Number of Visitors on 19-Jan-97 | 68 |
| Number of Visitors on 20-Jan-97 | 65 |
| Number of Visitors on 21-Jan-97 | 54 |
| Number of Visitors on 22-Jan-97 | 59 |
| Number of Visitors on 23-Jan-97 | 50 |
| Number of Visitors on 24-Jan-97 | 47 |
| Number of Visitors on 25-Jan-97 | 32 |
| Total Visitors this week | 375 |

NOTE: A "Visitor" is a person who click on book links from your site, and is counted as 1 visitor (above) regardless of the number of different titles they click on. We keep track of this by watching their shopping cart ID, which remains the same for every book they click on.
A "Hit" is any person clicking on a book link, and each click is counted as 1 hit. If the same visitor click on 5 different titles, we record 1 visitor and 5 hits. Therefore, you should expect the number of visitors to be lower than the total number of hits.

What is claimed is:

1. A method of selling items with the assistance of associates, the method comprising:

providing a Web site system that includes a browsable catalog of items and provides services for allowing customers to electronically purchase the items;

providing an associate enrollment system which allows users to electronically apply to operate as associates that select and recommend items from the catalog and refer customers to the Web site system in exchange for compensation;

in response to a submission to the enrollment system by a user, assigning an associate identifier to the user and recording the associate identifier within a computer memory;

electronically providing to the user instructions for generating hypertextual documents with item-specific links that, when selected by a customer, cause the user's associate identifier and an identifier of a recommended item to be transmitted to the Web site system in a request message;

receiving a request message which contains an associate identifier and an item identifier and extracting the associate and item identifiers from the message, the request message generated by a computer of a customer in response to selection by the customer of an item-specific link provided by an associate in conjunction with a recommendation of the item;

transmitting to the customer's computer a Web page which corresponds to the item identifier extracted from the request message;

transacting a sale of the item and/or other items of the catalog with the customer through the Web site system;

using the associate identifier extracted from the request message to identify the associate; and determining and recording within a computer memory compensation for the associate for the sale.

2. The method of claim 1, wherein determining and recording within a computer memory compensation for the associate comprises calculating a commission which is based at least in part on a selling price of an item purchased by the customer.

3. The method of claim 1, further comprising paying the commission to the associate electronically.

4. The method of claim 1, further comprising:

generating a feedback report which contains activity data for the item-specific link for a selected period of time; and transmitting the feedback report to the associate.

5. The method of claim 4, wherein the activity data comprises at least one of the following: (i) a number of click-through events produced by the link, (ii) a quantity of sales resulting from the click-through events, and (iii) commissions for the associate for the sales.

6. The method of claim 1, wherein the item is a book.

7. A method of selling items with the assistance of associates, the method comprising:

providing a Web site system that includes a browsable catalog of items and provides services for allowing customers to electronically purchase the items;

providing a database which contains information about a plurality of associates that select and recommend items from the catalog within respective areas of expertise, at least some of the associates operating associate Web sites that include item-specific links to the Web site system;

receiving from a computer of a customer a request message which contains an associate identifier and an item identifier and extracting the associate and item identifiers from the message, the request message generated in response to selection by the customer of a link of an associate Web site, the link provided in conjunction with a recommendation of the item by an associate;

transmitting to the customer's computer a Web page which corresponds to the item identifier extracted from the request message;

transacting a sale of the item and/or other items of the catalog with the customer through the Web site system;

using the associate identifier extracted from the request message and the database to identify the associate; and compensating the associate for the sale.

8. The method of claim 7, wherein compensating the associate for the sale comprising paying the associate electronically.

9. The method of claim 7, further comprising automatically generating and transmitting to the associate a report which contains activity data for the link for a selected period of time.

10. A method of selling items with the assistance of associates, the method comprising:

providing a Web site system that includes a browsable catalog of items and provides services for allowing customers to electronically purchase the items;

transmitting to a user a business agreement which specifies legal terms for operating as an associate that refers customers to the Web site system in exchange for compensation;

transmitting to the user an associate enrollment application which is adapted to be completed and electronically submitted to apply to operate as an associate;

electronically receiving a completed enrollment application from the user;

processing the completed enrollment application;

storing user information contained within the completed enrollment application and an associate identifier within a computer memory;

electronically providing to the user instructions for generating hypertextual documents with item-specific links that, when selected by a customer, cause the user's associate identifier and an identifier of a recommended item to be transmitted to the Web site system in a request message; and in response to a referral of a customer which results in a purchase of one or more items from the Web site system, determining compensation for the user for the referral.

11. The method of claim 10, wherein electronically providing instructions comprises transmitting to the user an associate identifier and instructions for incorporating the associate identifier into the item-specific links.

12. The method of claim 10, further comprising electronically paying the associate a monetary amount that represents the compensation.

13. The method of claim 10, further comprising generating and transmitting to the user a report which contains activity data for at least one item-specific link provided by the user.

14. A method of facilitating electronic purchases of items, comprising:

providing a Web site system that includes a browsable catalog of items and provides services for allowing customers to electronically purchase items from the catalog;

providing a system for allowing associates to operate associate Web sites that display selected items of the catalog and refer customers to the Web site system in exchange for compensation;

tracking a customer's selections of a plurality of items of the catalog from multiple different associate Web sites, wherein different items of the plurality are selected by the customer from different associate Web sites;

maintaining a record of the plurality of items selected by the customer within a shopping cart data structure within a computer memory of the Web site system;

with the Web site system, transacting a sale of the plurality of items recorded within the shopping cart data structure to the customer; and in response to the sale, determining, for each of the associate Web sites from which the items were selected, compensation for a corresponding associate.

15. The method of claim 14, wherein maintaining a record of the plurality of items comprises storing within the shopping cart data structure identifiers that correspond to the associate Web sites from which the respective items were selected.

16. The method of claim 14, further comprising the computer-implemented steps of:

generating a report that contains information about customer referrals produced by an associate Web; and transmitting the report to a corresponding associate.

17. A method of selling items from a catalog of items with the assistance of associates, the catalog accessible to users of a merchant Web site system which provides services for allowing users to electronically purchase items from the catalog, the method comprising:

enrolling a plurality of associates using an online registration system;

initiating electronic transfers to the associates of instructions for creating Web pages with links that are formatted to enable referrals of customers from Web sites of the associates to the merchant Web site to be tracked;

tracking referrals of customers from the Web sites of the associates to the merchant Web site system; and determining compensation for the associates for the referrals of customers that result in purchases of items from the catalog.

18. The method of claim 17, wherein enrolling a plurality of associates comprises automatically assigning associate identifiers to the associates, and wherein the instructions specify a format for including the associate identifiers within the links to permit the tracking of the customer referrals.

19. The method of claim 17, wherein enrolling a plurality of associates comprises providing electronic access to a document which contains terms and conditions for operating an associate Web site.

20. The method of claim 17, further comprising electronically paying the associates.

21. The method of claim 17, further comprising generating and electronically sending to an associate of the plurality a report which contains data about customer referrals and resulting sales attributed to the associate.

22. The method of claim 17, further comprising transmitting to at least one associate of the plurality a document which contains suggestions for building a successful online store.

23. A method of operating a virtual store to sell items in association with a merchant that operates a merchant Web site, the method comprising:

providing an associate Web site which is separate from the merchant Web site;

selecting from an electronic catalog of the merchant Web site a subset of items of the catalog to display within the associate Web site, the subset including at least one item;

for each item of the subset, incorporating into the associate Web site (a) a description and/or graphical representation of the item, and (b) a link which permits a user of the associate Web site to access the merchant Web site to purchase the item, the link formatted such that selection of the link by the user causes a computer of the user to generate a request message which includes an item identifier and an associate identifier; and receiving compensation for at least one referral of a user to the merchant Web site that results in a sale, the referral resulting from selection of the link.

24. The method of claim 23, further comprising generating an editorial description of at least one of the items of the subset, and incorporating the editorial description into the associate Web site.

25. The method of claim 23, wherein selecting from the electronic catalog comprises selecting a plurality of books which fall within a subject-based category to which the associate Web site pertains.

26. The method of claim 23, further comprising displaying a business name and/or logo of the merchant within the associate Web site to indicate an affiliation with the merchant.

27. The method of claim 23, further comprising incorporating into the associate Web site a link which corresponds to a group of products of the electronic catalog.

28. The method of claim 23, further comprising receiving an electronic report which contains data about customer referrals and resulting purchases produced by the associate Web site.

29. A method of assisting in sales of items from a catalog of items of a merchant Web site system, the method comprising:

completing and electronically submitting an online application to apply to operate as a referral source that refers customers to the merchant Web site system in exchange for compensation for referrals that produce sales;

electronically receiving instructions for creating Web pages with links that are formatted to permit the tracking of customer referrals to the merchant Web site system;

providing a Web site which is separate from the merchant Web site system;

incorporating into the Web site at least one Web page according to the instructions, the Web page including a link that is formatted to permit tracking of customer referrals to the merchant Web site system; and receiving compensation for at least one customer referral to the merchant Web site system that results in a sale of one or more items from the catalog, the customer referral resulting from selection by a customer of the link.

30. The method of claim 29, further comprising receiving an electronic document which contains terms and conditions for operating as a referral source.

31. The method of claim 29, wherein the link comprises a URL portion which includes a referral source identifier.

32. The method of claim 31, wherein the URL portion further includes an identifier of an item selected from the catalog.

33. The method of claim 29, further comprising displaying within the Web site a business name and/or logo corresponding to the merchant Web site system.

34. The method of claim 29, further comprising selecting at least one item from the catalog, and incorporating a description and/or graphical representation of the item into the Web site.

35. The method of claim 29, further comprising receiving an electronic report which contains data about customer referrals and resulting sales produced by the Web site.

36. A computer-implemented system which implements a program in which associates of a merchant electronically refer customers to a Web site of the merchant, the system comprising:

an associate registration system which implements an electronic application process to at least partially automate enrollment of associates, the associate registration system providing associates electronic access to instructions for forming Web pages with links that are formatted to permit tracking of customer referrals to the Web site;

a referral processing system which tracks referrals of customers to the Web site from associates using associate identifiers contained within request messages, the request messages generated by customer computers in response to selection of links provided by the associates according to the instructions; and a compensation system which determines and maintains records of compensation for the respective associates for the customer referrals that result in purchases of items from a catalog of the Web site.

37. The system of claim 36, wherein the associate registration system includes a downloadable application which is adapted to be completed and electronically submitted to apply to operate as an associate.

38. The system of claim 37, wherein the associate registration system includes software which scans entries submitted within the application to search for pre-specified terms.

39. The system of claim 36, wherein the associate registration system includes software which assigns associate identifiers to associate applicants.

40. The system of claim 36, wherein the compensation system calculates associate compensation based on selling prices of the items purchased by referred customers.

41. The system of claim 36, further comprising a report generation system which generates and sends to the associates feedback reports which include information about customer referrals and resulting sales.

42. The system of claim 41, wherein the report generation system includes an online menu for allowing associates to specify parameters for generating custom feedback reports.

* * * * *